(12) United States Patent
Filsfils et al.

(10) Patent No.: US 7,664,013 B2
(45) Date of Patent: *Feb. 16, 2010

(54) LOOP PREVENTION TECHNIQUE FOR MPLS USING SERVICE LABELS

(75) Inventors: Clarence Filsfils, Brussels (BE); David D. Ward, Somerset, WI (US); Stefano B. Previdi, Rome (IT); Jean-Philippe Vasseur, Dunstable, MA (US); Jim Guichard, Groton, MA (US); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 11/068,081

(22) Filed: Feb. 28, 2005

(65) Prior Publication Data

US 2006/0193248 A1 Aug. 31, 2006

(51) Int. Cl.
*H04L 12/26* (2006.01)
(52) U.S. Cl. ...................................................... 370/218
(58) Field of Classification Search ................ 370/225, 370/216, 217, 218, 219, 237, 395.53
See application file for complete search history.

(56) References Cited

U.S. PATENT DOCUMENTS

| | | | |
|---|---|---|---|
| 6,339,595 B1 | 1/2002 | Rekhter et al. | |
| 6,665,273 B1 | 12/2003 | Goguen et al. | |
| 6,728,246 B1 * | 4/2004 | Egbert et al. | 370/392 |
| 6,778,492 B2 | 8/2004 | Charny et al. | |
| 7,093,027 B1 * | 8/2006 | Shabtay et al. | 709/239 |
| 7,152,115 B2 * | 12/2006 | Ould Brahim et al. | 709/238 |
| 7,286,467 B1 * | 10/2007 | Sylvain | 370/216 |
| 2002/0060985 A1 | 5/2002 | Lee et al. | |
| 2002/0112072 A1 | 8/2002 | Jain | |
| 2002/0131411 A1 * | 9/2002 | Bhatia | 370/389 |
| 2003/0028818 A1 | 2/2003 | Fujita | |
| 2003/0233595 A1 | 12/2003 | Charny et al. | |
| 2004/0052207 A1 | 3/2004 | Charny et al. | |
| 2004/0109687 A1 | 6/2004 | Park et al. | |
| 2004/0114595 A1 * | 6/2004 | Doukai | 370/389 |
| 2004/0156310 A1 | 8/2004 | Fredette et al. | |
| 2004/0196822 A1 | 10/2004 | Proctor | |

(Continued)

OTHER PUBLICATIONS

Andrew S. Tanenbaum, "Computer Networks", Fourth Edition, Section 1.4.2 pp. 41-44, Pearson Education 2003.

(Continued)

*Primary Examiner*—Kwang B Yao
*Assistant Examiner*—Alex Skripnikov
(74) *Attorney, Agent, or Firm*—Cesari and McKenna, LLP

(57) ABSTRACT

A local fast reroute (FRR) technique is implemented at the edge of a computer network. In accordance with the technique, if an edge device detects a node or link failure that prevents it from communicating with a neighboring routing domain, the edge device reroutes at least some data packets addressed to that domain to a backup edge device which, in turn, forwards the packets to the neighboring domain. The rerouted packets are designated as being "protected" (i.e., rerouted) data packets before they are forwarded to the backup edge device. The backup edge device identifies protected data packets as those which contain a predetermined "service" label in their MPLS label stacks. In other words, the service label is used as an identifier for packets that have been FRR rerouted. Upon receiving a data packet containing a service label, the backup edge device is not permitted to reroute the packet a second time, e.g., in response to another inter-domain node or link failure, thereby preventing loops from developing at the edge of the network.

23 Claims, 7 Drawing Sheets

U.S. PATENT DOCUMENTS

2004/0196827 A1 10/2004 Xu et al.
2005/0030921 A1* 2/2005 Yau ........................... 370/329

OTHER PUBLICATIONS

Radia Perlman, "Interconnections Second Edition: Bridges, Routers, Switches, and Internetworking Protocols", Chapter 9 pp. 189-220, Addison Wesley Longman, Inc. 2000.

Radia Perlman, "Interconnections Second Edition: Bridges, Routers, Switches, and Internetworking Protocols", Sections 12.1-12.3 pp. 299-324, Addison Wesley longman, Inc. 2000.

Stephen A. Thomas, "IP Switching and Routing Essentials", Chapter 7 pp. 221-243, 2002.

Ivan Pepelnjak and Jim Guichard, "MPLS and VPN Architectures", Chapters 8-9 pp. 145-205, Cisco Press 2001.

E. Rosen and Y. Rekhter, "BGP/MPLS VPNs", Request for Comments 2547, Mar. 1999.

Y. Rekhter and T. Li, "A Border Gateway Protocol 4 (BGP-4)", Request for Comments 1771, Mar. 1995.

"MPLS Traffic Engineering Fast Reroute-Link Protection" available at http://www.cisco.com/univercd/cc/td/doc/product/software/ios120/120newft/120limit/120st/120st16/frr.htm#wp1015327.

Clarence Filsfils et al., "Fast Reroute (FRR) Protection At the Edge of a RFC 2547 Network" U.S. Appl. No. 11/010,225, filed Dec. 10, 2004.

Clarence Filsfils et al., "Loop Prevention Technique for MPLS Using Two Labels" U.S. Appl. No. 11/046,163.

PCT Notification of Transmittal of the International Search Report and the Written Opinion of the International Searching Authority, or the Declaration, International Application No. PCT/US06/04488, International Filing Date Feb. 9, 2006, Date of Mailing Aug. 13, 2007, 11 pages.

\* cited by examiner

| ADDRESS PREFIX 520 | VPN LABEL VALUE 530 | EGRESS IDENTIFIER 540 | FRR ENABLE FLAG 550 | FRR EXCLUDE FLAG 560 | BACKUP PE DEVICE 570 | BACKUP LABEL STACK (IGP LABEL, SERVICE LABEL, VPN LABEL) 580 |
|---|---|---|---|---|---|---|
| 10.1.2.0/24 | 57 | 1 | 1 | 0 | PE2 | 100, 4, 75 |
| ... | ... | ... | ... | ... | ... | ... |

LABEL FORWARDING TABLE 500

LOOP PREVENTION TECHNIQUE FOR MPLS USING SERVICE LABELS

RELATED APPLICATIONS

This application is related to U.S. patent application Ser. No. 11/010,225, entitled FAST REROUTE (FRR) PROTECTION AT THE EDGE OF A RFC 2547 NETWORK, filed Dec. 10, 2004, by Clarence Filsfils et al., the teachings of which are expressly incorporated herein by reference.

This application is related to U.S. patent application Ser. No. 11/046,163, entitled LOOP PREVENTION TECHNIQUE FOR MPLS USING TWO LABELS, filed Jan. 26, 2005, by Clarence Filsfils et al., the teachings of which are expressly incorporated herein by reference.

FIELD OF THE INVENTION

This invention relates generally to routing data between private routing domains, and, more specifically, to a fast reroute (FRR) technique that quickly and efficiently reroutes network traffic to a neighboring exit point in the event of a node or link failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as is though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are required to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, the network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference is book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4* (BGP-4), by Y. Rekhter et al., published March 1995, which is publicly available through the Internet Engineering Task Force (IETF) and is hereby incorporated by reference in its entirety. A variation of the BGP protocol, known as internal BGP (iBGP), is often used to distribute inter-network reachability information (address prefixes) among BGP-enabled edge devices in a routing domain. To implement iBGP, the edge devices must be "fully meshed," i.e., such that every device is coupled to every other device by way of a TCP connection. In practice, conventional route reflectors are used to logically couple devices into a full mesh. The BGP protocol also may be extended for compatibility with other services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. Typically, an IGP label determines the packet's next hop within a routing domain, and a VPN label determines the packet's next hop across routing domains. More generally, the IGP label may be a MPLS label or any other encapsulation header used to identify the packet's next hop in the routing domain.

The packet may contain a "stack" of labels such that the stack's top-most label determines the packet's next-hop destination. After receiving the packet, the MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

FIG. 1 illustrates an exemplary MPLS/VPN network 100 containing a provider network 110 coupled to neighboring customer sites 120, 130 and 140. The provider network includes a plurality of PE devices 400, including devices PE1 400a, PE2 400b and PE3 400c. The PE devices are fully meshed at the BGP level. That is, each PE device in the provider network can communicate with every other PE device (either directly or by means of BGP route reflectors). The network 110 also contains "core" provider (P) devices 195a-d, such as routers, which are respectively labeled P1, P2, P3 and P4. These P devices may be used to establish label switched paths between pairs of PE devices. For example, the provider devices P1 and P2 may be used to establish a first LSP1 between PE3 and PE1, and the devices P3 and P4 may be used to establish a second LSP2 between PE3 and PE2.

Each neighboring customer site 120-140 contains one or more CE devices attached to PE devices in the provider network 110. For instance, the customer site 120 contains CE devices 160 and 165 (labeled CE1 and CE2) which are respectively coupled to PE1 and PE2. Similarly, the customer site 130 includes a CE device 135 (labeled CE4) attached to PE2 and the customer site 140 includes a CE device 185 (labeled CE3) attached to PE3. The customer sites 120-140 are assigned to respective VPNs. For purposes of illustration, the customer sites 120 and 140 are assigned to the VPN1 and the customer site 130 is assigned to the VPN2. In this arrangement, network nodes in the customer sites 120 and 140 (VPN1) may not establish communications with nodes in the customer site 130 (VPN2) and vice versa since they participate in different VPNs. However, network nodes in the customer site 120 may communicate with nodes in the customer site 140, and vice versa, since the customer sites 120 and 140 both participate in VPN1. Notably, VPN1 and VPN2 may contain overlapping IP address spaces.

As noted, communications may be established through the MPLS/VPN network 100 between remote customer sites participating in the same VPN, e.g., VPN1. The provider network 110 may create a MPLS tunnel, such as LSP1 or LSP2, to provide a logical data path between the remote customer sites of VPN1. Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE3. PE3 then determines an appropriate LSP over which to forward the packet through the provider network 110 to the customer site 120 containing the packet's addressed destination node 155.

The provider edge device PE3 may associate the received packet 105 with a LSP based on the packet's contained destination IP address. For purposes of discussion, assume the packet 105 is routed from PE3 to PE1 via LSP1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a PE-CE data link. For example, suppose that the PE1-CE1 link fails as denoted by a dotted "X." After identifying the failure, the provider edge device PE1 may advertise, within the provider network 110, that it has lost reachability to the IP addresses previously advertised by CE devices in the customer site 120. Accordingly, PE1 may propagate the identified routing change by disseminating iBGP update messages to its fully-meshed PE devices. Eventually, the routing change is distributed throughout the provider network 110 and each PE device updates its local routing information to converge on the new network topology, i.e., without the failed PE1-CE1 link.

The conventional latency required for the PE devices to converge on the new network topology, i.e., without the PE1-CE1 link, is often overly time consuming, e.g., on the order of seconds, and causes a number of significant problems. For instance, data packets are often "dropped" (i.e., discarded) at the edge of the provider network while the network is in the process of converging. For example, in response to the PE1-CE1 link failing, data packets 105 addressed to the destination node 155 will be dropped by PE1 (at the tail-end of LSP1) until the network converges on an alternate data path LSP2 for those packets. For many data flows, such as voice-over-IP (VoIP) and video data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to CE node or link failures over PE-CE links. The MPLS/VPN networks should quickly converge on the new network topology with minimal data loss at the edge of the network.

SUMMARY OF THE INVENTION

The present invention overcomes the disadvantages of the prior art by providing a local fast reroute (FRR) technique that may be implemented at the edge of a computer network. In accordance with the technique, if an edge device detects a node or link failure that prevents it from communicating with a neighboring routing domain, the edge device reroutes at least some data packets addressed to that domain to a backup edge device which, in turn, forwards the packets to the neighboring domain. The rerouted packets are designated as being "protected" (i.e., rerouted) data packets before they are forwarded to the backup edge device. The backup edge device identifies protected data packets as those which contain a predetermined "service" label in their MPLS label stacks. In other words, the service label is used as an identifier for packets that have been FRR rerouted. Upon receiving a data packet containing a service label, the backup edge device is not permitted to reroute the packet a second time, e.g., in response to another inter-domain node or link failure, thereby preventing loops from developing at the edge of the network.

Illustratively, non-protected data packets may be routed using a two-level MPLS label stack having a "top" IGP label and a "bottom" VPN label, whereas protected data packets contain a three-level MPLS label stack in which a service label is situated between the IGP and VPN labels. The service label may be configured to store a predetermined service label value that is globally recognized by each of the edge devices in the network. Alternatively, at least some of the edge devices may be associated with their own locally-allocated service label values. In such a scenario, a FRR-rerouted packet destined for a particular backup edge device transports the backup device's locally-allocated service label value. Yet other embodiments may associate a locally-allocated service label value with every network device configured to receive and/or forward FRR-rerouted data packets. In this case, each device that forwards a rerouted data packet first replaces the packet's service label with another service label having a label value associated with the packet's next hop, until the packet reaches its destined backup edge device. Preferably, each device's locally-allocated service label value is selected from a pool of well-known predetermined service label values.

Advantageously, the inventive technique provides a fast and efficient way for a backup edge device to identify protected data packets that have been previously rerouted in response to, e.g., a CE node or PE-CE link failure. The technique may be used in conjunction with penultimate hop popping (PHP), whereby PHP-enabled devices that are directly attached to a backup edge device "pop" IGP labels from both protected and non-protected data packets before forwarding the packets to the backup edge device. The technique is not limited to MPLS/VPN network architectures and may be deployed at the edge of networks implementing various topologies and protocols. Further, the invention is not limited to any particular hardware platform or set of software capabilities.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an illustrative label forwarding table configured to store FRR-related information;

DETAILED DESCRIPTION OF ILLUSTRATIVE EMBODIMENTS

In accordance with the illustrative embodiments, if an edge device detects a node or link failure that prevents it from communicating with devices in a neighboring domain, the edge device reroutes at least some data packets addressed to the neighboring domain to a backup edge device. The rerouted packets are preferably "tunneled" to the backup edge device, e.g., using an IP or MPLS tunneling mechanism. After receiving the rerouted packets, the backup edge device forwards the packets to the neighboring domain. Notably, the backup edge device is not permitted to reroute the received packets a second time, e.g., upon identifying another inter-domain node or link failure. As such, packet loops are avoided at the edge of the network.

Figure 1:
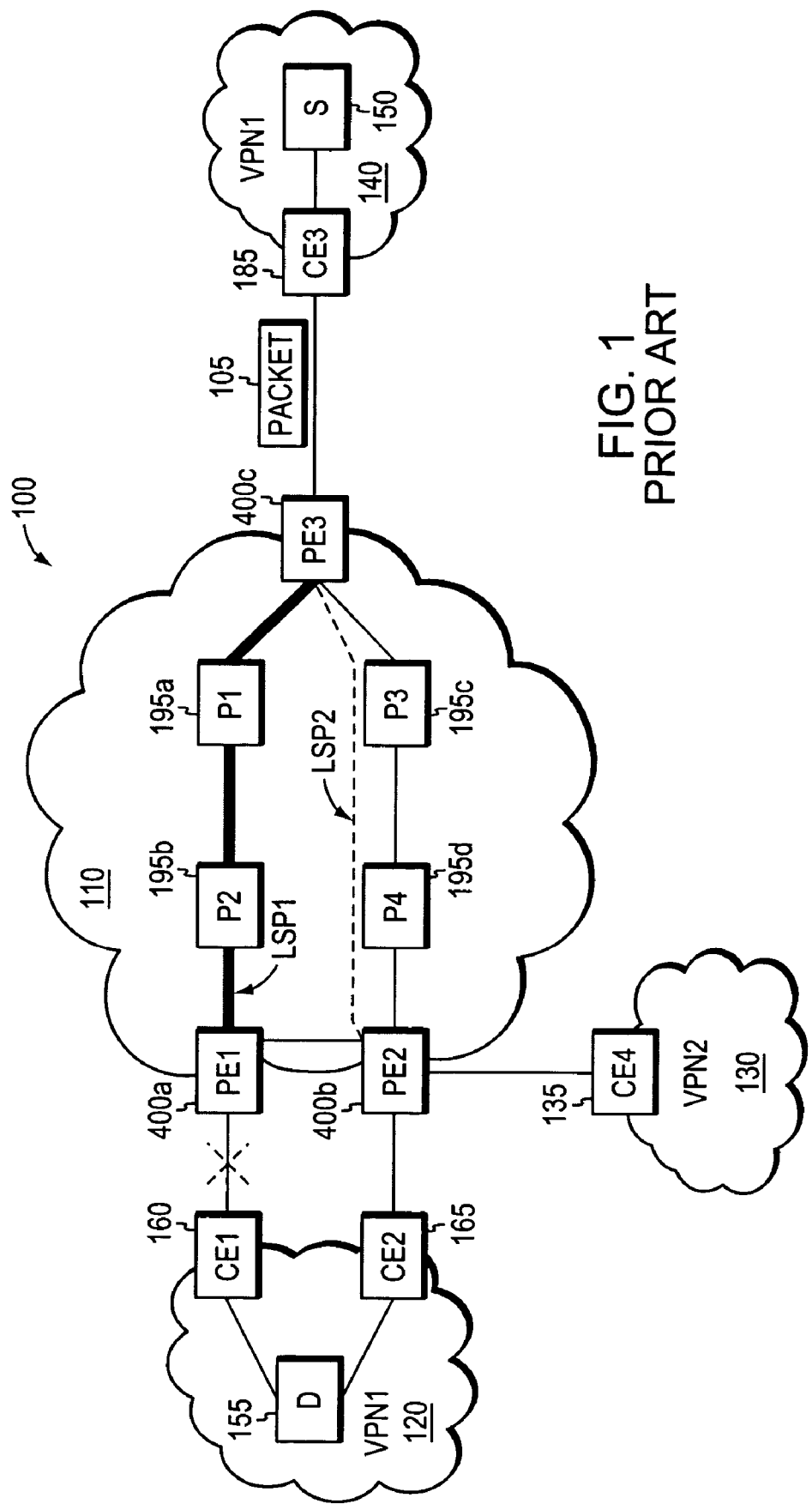
FIG. 1, previously described, is a schematic block diagram of a MPLS/VPN network topology.
Figure 2:
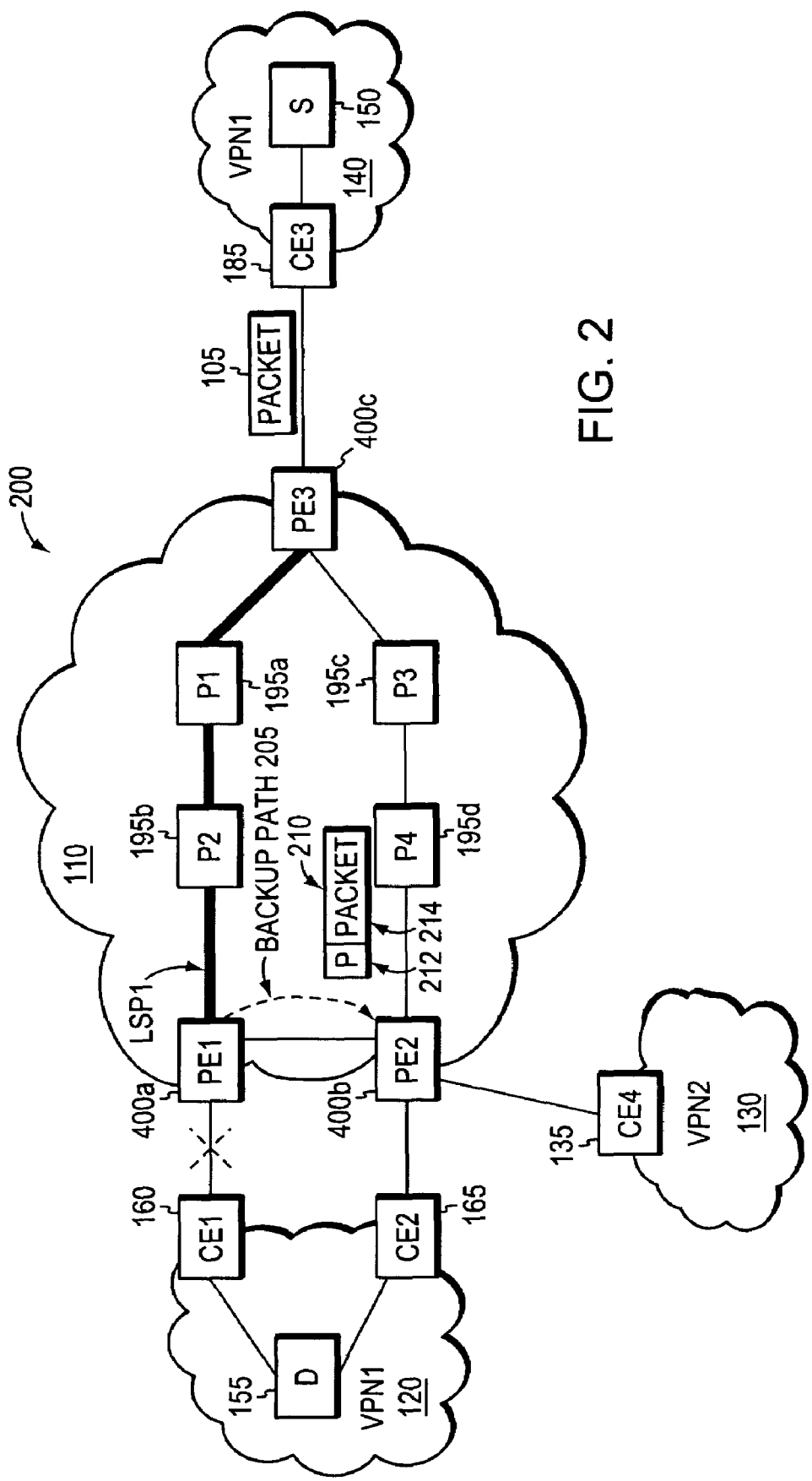
FIG. 2 is a schematic block diagram of an exemplary MPLS/VPN network topology in which the illustrative fast reroute (FRR) technique may be employed at the edge of the network. Those skilled in the art will appreciate that the network topology of FIG. 2 is merely representative and that the inventive FRR technique may be employed in other network topologies as well.

FIG. 2 illustrates a computer network 200 employing an illustrative embodiment of the invention. For ease of explanation, the network topology of network 200 is the same as that shown in FIG. 1. However, unlike in the network 100, the provider edge device PE1 does not "drop" packets upon losing communication with its neighboring customer site 120, e.g., due to a CE1 node failure or PE1-CE1 link failure. Instead, PE1 establishes a fast reroute (FRR) backup path 205 which is used to reroute at least some packets 210 to a backup provider edge device PE2 which is also coupled to the customer site 120. Packets 210 transported over the FRR backup path 205 may be encapsulated with at least one IP tunnel header or MPLS label stack associated with the backup path.

Prior to forwarding the rerouted packets to the backup edge device PE2, the edge device PE1 designates the rerouted packets as being "protected." For purposes of illustration, the rerouted packet 210 is shown as the concatenation of its protected status ("P") 212 and packet data ("packet") 214. Here, a packet's protected status 212 indicates that the packet is being rerouted in response to an inter-domain node or link failure. Illustratively, the protected status 212 is stored in a "service" label transported in the data packet 210. The service label identifies the packet as having been FRR rerouted. The provider edge device PE2, after receiving the protected packet 210, is not permitted to reroute the packet 210 a second time in the event that it too loses communication with the customer site 120, e.g., due to a CE2 node failure or a PE2-

CE2 link failure. Thus, the rerouted packet 210 cannot be circulated within loops created at the edge of the provider network 110.

In a first illustrative embodiment, non-protected data packets are routed using a two-level MPLS label stack having a "top" IGP label and a "bottom" VPN label, whereas protected data packets contain a three-level MPLS label stack in which a service label is situated between the IGP and VPN labels. According to this illustrative embodiment, the IGP label is used to route a protected packet to the backup edge device, and the backup edge device "pops" the IGP label to access the underlying service label which identifies the packet as being FRR protected. The backup edge device pops the service label and performs a packet-forwarding determination based on the packet's VPN label; if the forwarding determination indicates that the protected packet should be FRR rerouted a second time, the packet is dropped. Otherwise, the backup edge device pops the VPN label and forwards the packet to an appropriate CE device.

Figure 3A:
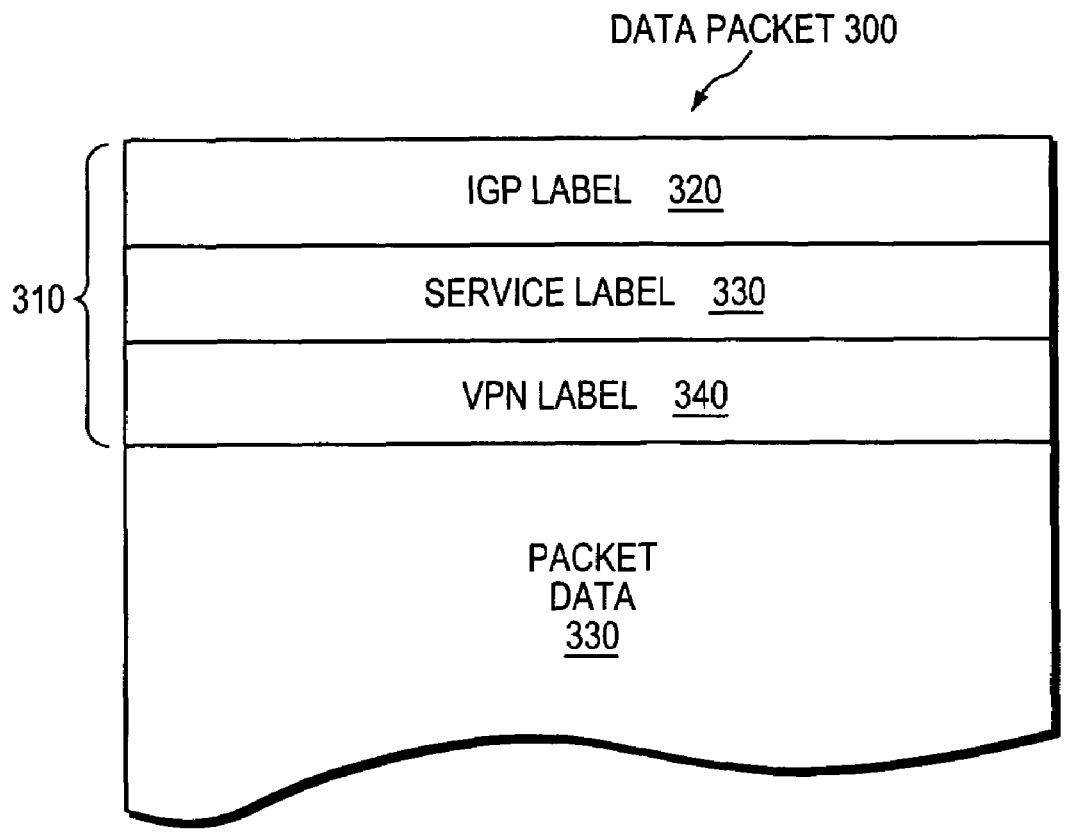
FIG. 3A is a schematic block diagram of an illustrative data packet that includes a Multi-Protocol Label Switching (MPLS) label stack in accordance with an illustrative embodiment of the invention.

FIG. 3A illustrates an exemplary protected data packet 300 that may be communicated within the provider network 110 in accordance with the first illustrative embodiment. The packet 300 includes a MPLS label stack 310 and packet data 330. Although not shown, a conventional data-link header is typically prepended to the packet's label stack 310. The top-most label in the label stack is an interior gateway protocol (IGP) label 320 that identifies the packet's next "hop" between label switched routers in the provider network. In general, the IGP label may be a MPLS label or any other encapsulation header used to identify the packet's next hop. The label stack 310 also contains a bottom-most virtual private network (VPN) label 340 that identifies a particular customer-site VPN route for the packet at a given PE device.

A service label 330 is situated between the IGP and VPN labels 320 and 330. As noted, the presence of the service label indicates that the protected packet 300 was previously FRR-rerouted at the edge of the provider network 110. While the IGP and VPN labels are included in both non-protected and protected data packets, the service label is only included in protected packets. P and PE devices in the provider network typically distribute their IGP label values using, e.g., the LDP or RSVP protocols; fully-meshed PE devices may distribute their service labels and/or VPN label values using, e.g., the MP-BGP protocol. In practice, when a backup PE device determines that a received data packet 300 contains the service label 330, the backup PE device may not reroute the protected packet a second time, e.g., in response to another CE device or PE-CE link failure.

Figure 3B:
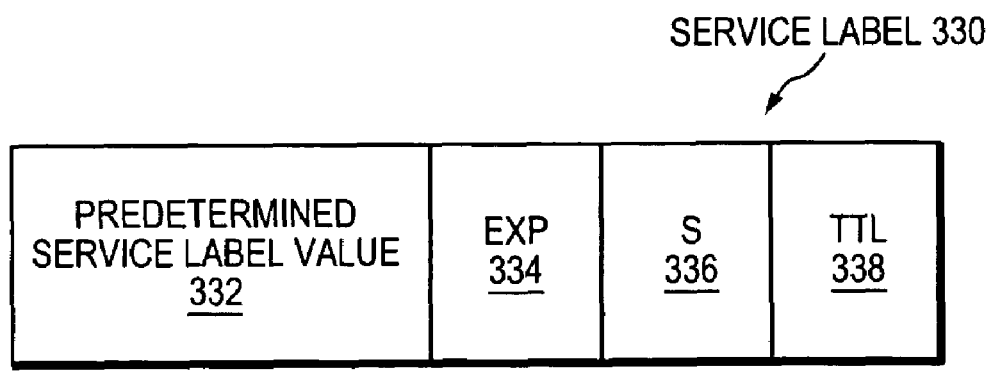
FIG. 3B is a schematic block diagram of an exemplary service label that may be included in the MPLS label stack.

As shown in FIG. 3B, the service label 330 is preferably implemented as a conventional 32-bit MPLS label containing a 20-bit label-value field 332, a set of three experimental (EXP) bits 334, a one-bit stack flag (S) 336 and an 8-bit time-to-live (TTL) field 338. The label-value field 332 stores a predetermined service label value that indicates that the data packet 300 was previously FRR-rerouted. In accordance with an illustrative embodiment, the field 332 stores a single (global) predetermined service label value, e.g., equal to 4, that is utilized throughout the provider network 110. In other illustrative embodiments, the label-value field 332 may be used to store a locally-allocated predetermined service label value, e.g., associated with the packet's next-hop destination or with the packet's destined backup PE device. Preferably, the service label value stored in the field 332 is selected from a pool of well-known predetermined service label values.

In current MPLS deployments, the EXP bits 334 are typically unused. The stack flag 336 stores a value that indicates whether the service label 330 is located at the bottom of the MPLS label stack 310. For instance, in the illustrative embodiments, the stack flag 336 stores a value indicating that the service label 330 is not at the bottom of the stack, since the VPN label 340 resides at the stack's bottom. The TTL field 338 generally stores a "hop limit" count that may be used to determine when a packet has "aged" and is therefore no longer deemed valid. The TTL field 338 may be initialized to equal a hop count stored in the packet's IP header, and may be decremented after every hop as known in the art. However, other embodiments may not utilize the service label's TTL field 338.

Figure 4:
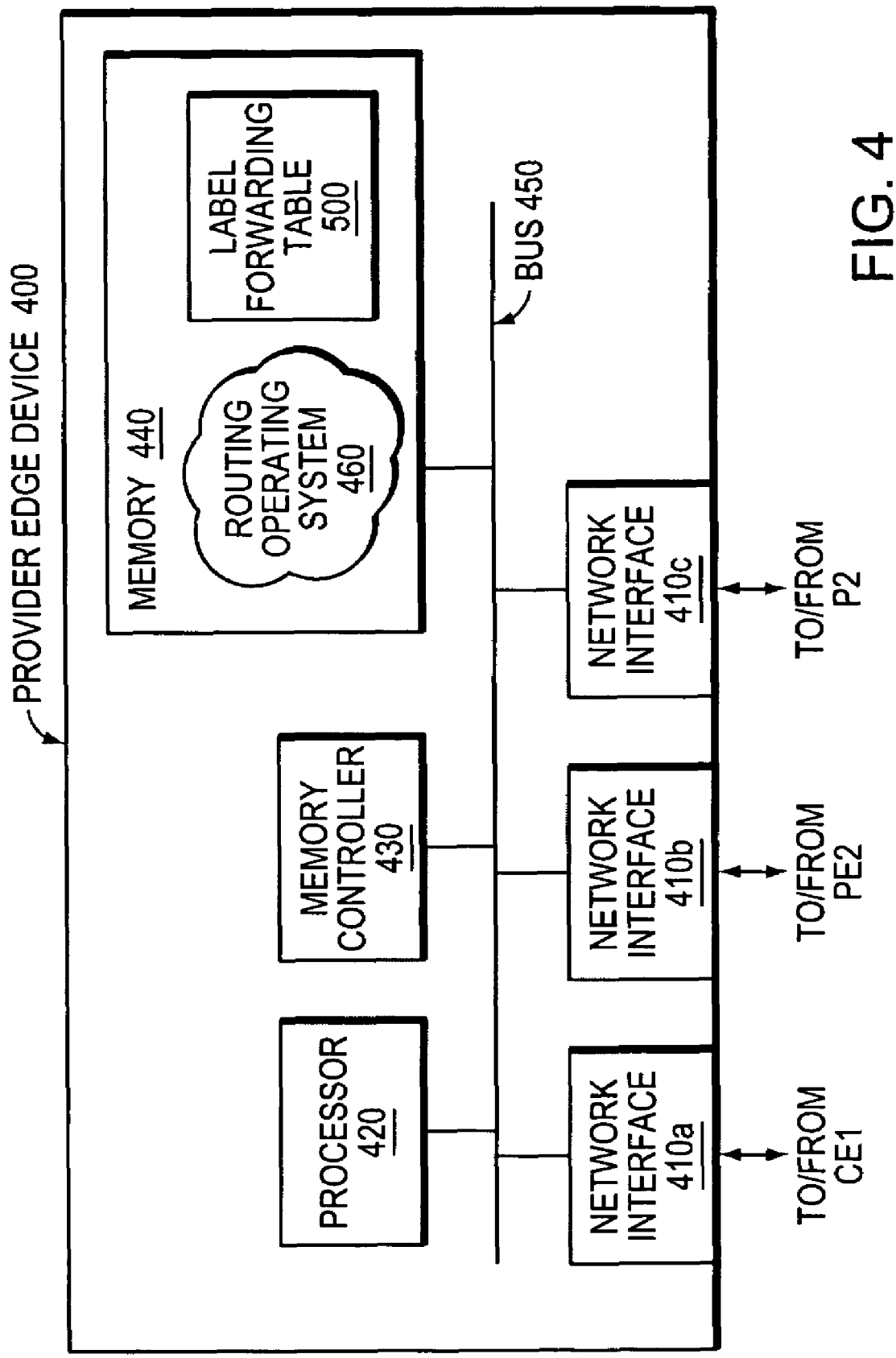
FIG. 4 is a schematic block diagram of a provider edge (PE) device which may implement FRR operations at the edge of a MPLS/VPN network.

FIG. 4 is a schematic block diagram of an exemplary provider edge device 400, such as a router, that may be advantageously used with the present invention. Suitable intermediate nodes that may be used with the present invention include, but are not limited to, the Cisco 7200 and 7600 Series Routers and Catalyst 6500 Series Switches available from Cisco Systems Incorporated, San Jose, Calif. For ease of illustration and description, the PE device 400 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 400 is merely exemplary and that the advantages of the present invention may be realized on a variety of different hardware platforms having various software capabilities.

The PE device 400 comprises one or more network interfaces 410, a processor 420, a memory controller 430 and a memory 440 interconnected by a system bus 450. Each network interface 410 may be a physical or logical interface that connects the PE device 400 with a neighboring node. For example, as shown, the network interface 410a is coupled to the customer edge device CE1 located in the customer site 120. The network interfaces 410b and 410c are respectively coupled to the devices PE2 and P2 in the provider network 110. Each network interface 410 may be adapted to transfer and acquire data packets to and from various transport media such as, e.g., Fast Ethernet (FE), is Gigabit Ethernet (GE), wireless links, optical links, etc. Functionally, the interfaces 410 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 440 comprises a plurality of storage locations that are addressable by the processor 420 and the network interfaces 410 via the memory controller 430. The memory 440 preferably comprises a form of random access memory (RAM) that is generally cleared by a power cycle or other reboot operation (e.g., it is a "volatile" memory). For instance, the memory 440 may comprise dynamic RAM (DRAM) and/or synchronous DRAM (SDRAM) storage locations adapted to store program code and data structures accessible to the processor 420. It will be apparent to those skilled in the art that the memory 440 also may comprise other memory means, including various computer-readable media, for storing program instructions and data structures pertaining to the operation of the PE device 400. Further, those skilled in the art will appreciate that at least some portions of the memory 440 may be embodied as electromagnetic signals that are transmitted from a remote memory element to the PE device 400.

The memory 440 stores, among other things, computer-readable instructions for implementing a routing operating system 460 that functionally organizes the PE device 400 by, e.g., invoking network operations in support of software processes and services executing on the processor 420. The IOS™ operating system by Cisco Systems Incorporated is one example of an operating system 460 that may be stored in the memory 440 and executed in accordance with the illustrative embodiments herein. The IOS operating system includes various routing services, such as conventional interior and exterior gateway protocols. The present invention also may be deployed with other operating systems, such as the IOS-XR™ operating system by Cisco Systems Incorporated, in which one or more of these routing services is executed as a separate process, i.e., having its own process address space apart from the operating system's.

The memory 440 stores a label forwarding table 500 (or "label forwarding information base (LFIB)") configured to store VPN label information used to forward data packets from the PE device 400 to neighboring customer sites. The label forwarding table 500 is also configured to store FRR-related information as described in more detail below. The memory 440 may include a separate label forwarding table (not shown) for storing IGP label information used to forward data packets within the provider network 110. When the PE device 400 receives a data packet from a P or PE device in the provider network 110, the operating system 460 may locate a VPN label value 340 in the received packet's MPLS label stack 310. The operating system then may perform a label lookup operation in the label forwarding table 500 based on the packet's VPN label value. The result of the lookup operation can be used to determine a particular PE-CE link over which the received packet should be forwarded next.

FIG. 5 illustrates an exemplary label forwarding table 500 that may be used in accordance with the first illustrative embodiment. The table 500 includes a plurality of table entries 510, each of which is configured to store, among other things, an address prefix value 520, a VPN label value 530, an egress identifier value 540, a "FRR enable" flag value 550, a "FRR exclude" flag value 560, a backup PE device identifier 570 and a backup MPLS label stack 580. The address prefix value 520 stores an IP address prefix that is reachable to the PE device 400 from a directly-attached CE device. The VPN label value 530 indicates to which VPN the address prefix value 520 belongs. The egress identifier value 540 is used to identify which network interface 410 should be used to forward data packets whose VPN label values 320 equal the VPN label value 530 and whose destination IP addresses match the address prefix value 520.

The FRR enable flag 550 stores a value indicating whether FRR operations are currently being performed for data packets having VPN label values and destination IP addresses that match the contents of the table entry 510. When the operating system 460 detects a node or link failure over a PE-CE data link, the operating system sets the FRR enable flag values for those IP address prefixes 520 that were reachable over the failed PE-CE link. As used herein, the FRR enable flag 550 is "set" when it equals a first predetermined value (e.g. "1"). Otherwise, the FRR enable flag equals a second predetermined value (e.g., "0").

The FRR exclude flag 560 stores a value indicating whether FRR operations should not be performed even when the FRR enable flag 550 is set. The FRR exclude flag may equal a first predetermined value (e.g. "1") to indicate that FRR operations are not permitted to be performed and may equal a second predetermined value (e.g., "0") otherwise. The value of the FRR exclude flags 560 may be manually selected, e.g., by a system administrator. However, in a preferred embodiment, the FRR exclude flag values are dynamically determined by the routing operating system 460. For instance, the operating system may specify that only address prefixes advertised by selected customer sites or by customer sites participating in certain VPNs may be FRR protected.

A set of one or more backup PE devices 570 may be associated with each address prefix value 520. Each backup PE device may be associated with a backup label stack 580, e.g., including an IGP label value, a service label value and a VPN label value, that should be included in FRR rerouted packets 210 matching the table entry 510. The IGP label value may be determined based on the contents of a separate label forwarding table (not shown) configured to store IGP label information used to forward data packets within the provider network 110. The backup PE devices 570 and their backup label stacks 580 may be statically configured, e.g., by a system administrator, or dynamically "learned" (acquired) by the operating system 460.

As shown, the exemplary label forwarding table 500 contains a table entry 510 for received data packets storing a VPN label value equal to 57 and a destination IP address matching the address prefix value 10.1.2.0/24. In this example, the flag values 550 and 560 indicate that FRR operations are currently underway and have not been excluded for non-protected data packets containing VPN label values equal to 57. The egress identifier value 540 indicates over which network interface 410 the received data packets should be forwarded. The table entry 510 also indicates that data packets matching the prefix 520 and VPN label value 530 should be FRR rerouted to the backup PE device PE2, and that the rerouted packets should include a MPLS label stack having an IGP label value equal to 100, a service label value equal to 4 and a VPN label value equal to 75.

Figure 6:
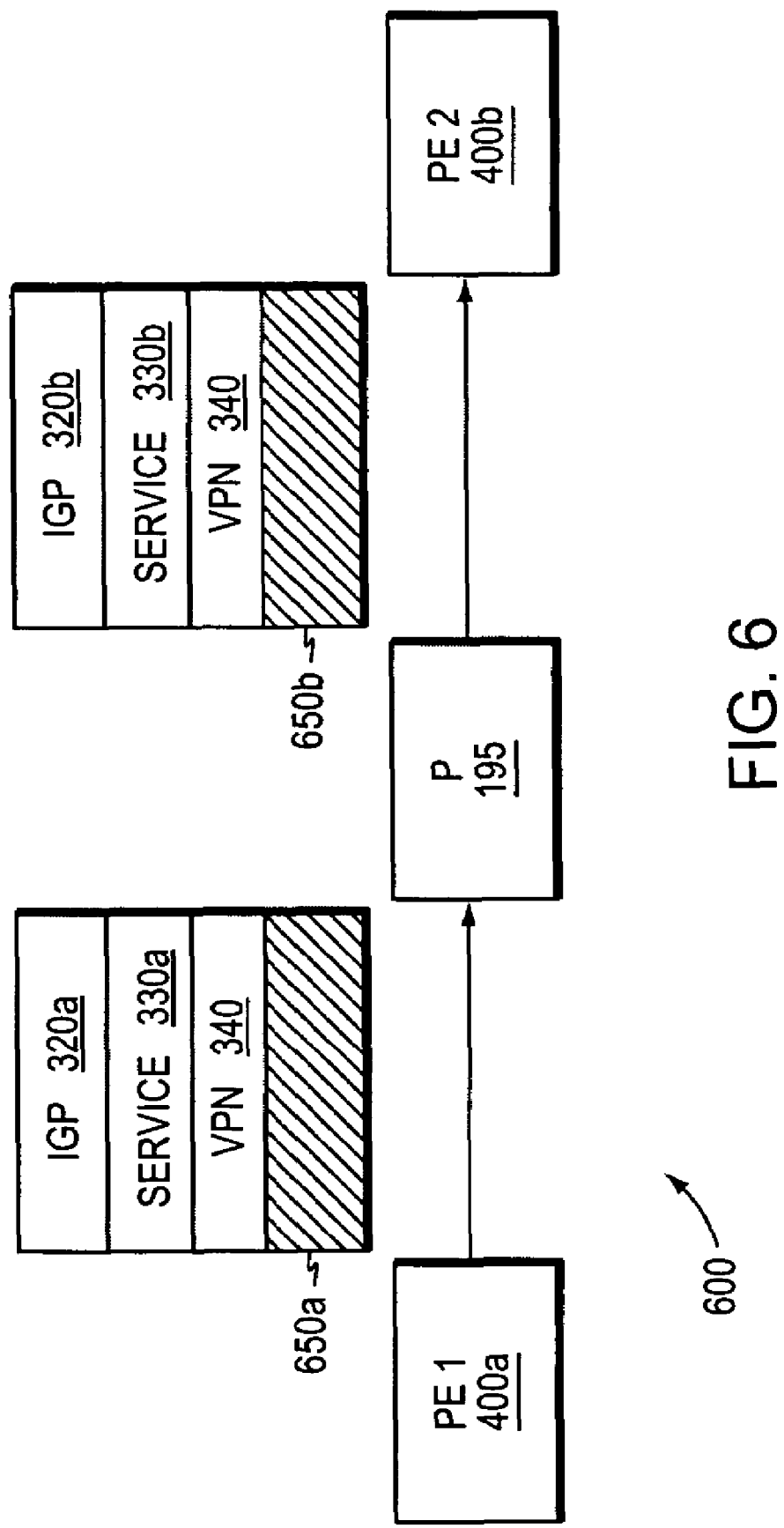
FIG. 6 is a schematic block diagram of an exemplary FRR backup path in which each network device in the path may be associated with a respective locally-allocated predetermined service label value.

FIG. 6 illustrates an exemplary backup path 600 between the provider edge device PE1 400a and the backup edge device PE2 400b. Unlike the backup path 205 illustrated in FIG. 2, the backup path 600 includes a P device 195 situated between the provider edge devices PE1 and PE2. In this network configuration, a protected data packet 650 is forwarded from PE1 to P, which in turn forwards the packet to PE2. The P device and the backup edge device PE2 respectively allocate local IGP values along the backup path 600. That is, the P device 195 allocates a first IGP label value 320a that is locally unique to the P device. Likewise, the backup edge device PE2 allocates a second IGP label value 320b that is locally unique to PE2. The IGP label values 320a and 320b may or may not be equal to one another. Typically, the IGP label values 320a,b are associated with respective loopback interfaces instantiated at the P and PE2 devices. In operation, a protected packet 650a including the IGP label value 320a may be forwarded from PE1 to P, then P may replace the packet's IGP label 320a with the IGP label 320b before forwarding the protected packet 650b to PE2.

In accordance with an illustrative embodiment, the FRR-protected data packets 650a and 650b may transport service labels 330a and 330b containing the same predetermined service label value, e.g., equal to 4. For instance, the predetermined service label value may be a globally recognized service label value, or may be a service label value that has been locally allocated at PE2 to identify FRR-rerouted traffic. However, in alternative illustrative embodiments, the service labels 330a and 330b are locally allocated by the P and PE2 devices. In this case, the predetermined service label values 330a and 330b are not necessarily equal. More generally, in such an embodiment, every network device configured to receive and/or forward FRR-rerouted data packets may allocate its own locally-unique service label value, e.g., selected from a pool of well-known predetermined service label values.

Assume that the IGP labels 320*a,b* and service labels 330*a,b* are locally allocated along the backup path 600. Accordingly, PE1 forwards the protected packet 650*a* having a top-most IGP label 320*a*, a service label 330*a* and a bottom-most VPN label 340. The packet is received by the P device 195, which pops the IGP and service labels 320*a* and 330*a*, performs a label-lookup operation using the IGP label 320*a* and then pushes new IGP and service labels 320*b* and 330*b* onto the packet's label stack based on the results of the label-lookup operation. The resulting packet 650*b* is forwarded to the backup edge device PE2.

PE2 receives the packet 650*b* and pops the packet's IGP label 320*b* (assuming the IGP label was not previously removed via PHP). Because the packet includes the service label 330*b*, the backup edge device PE2 identifies the packet as having already been FRR-rerouted. PE2 pops the service label 330*b* and then performs a label-lookup operation in its label forwarding table 500 based on the packet's VPN label 340. If the packet's matching table entry 510 indicates that the packet should be FRR-rerouted a second time, then the packet is dropped. Otherwise, PE2 pops the VPN label 340 and forwards the data packet in accordance with the contents of the matching table entry 510.

Figure 7:
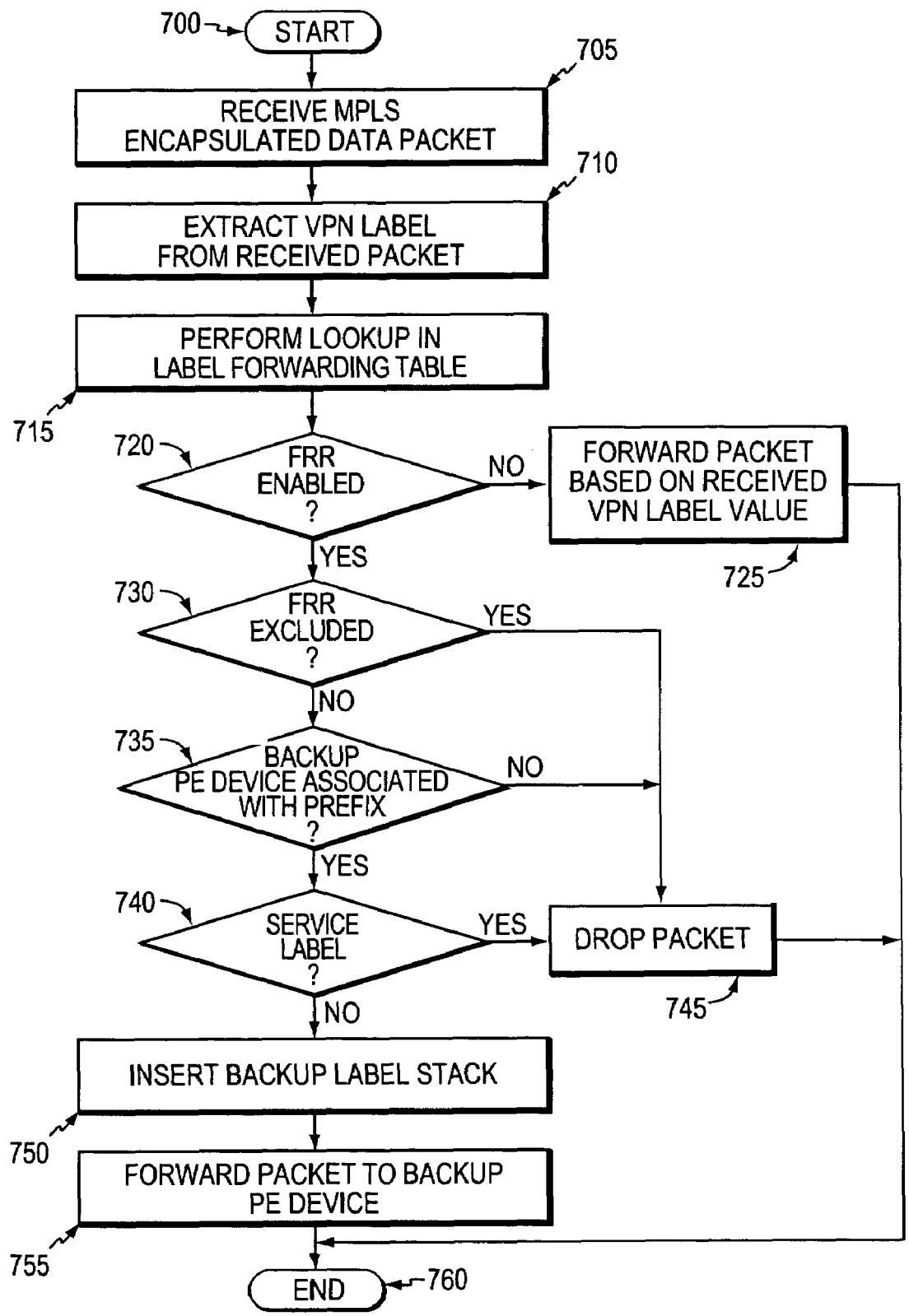
FIG. 7 is a flowchart illustrating a sequence of steps for performing FRR operations at the edge of a network in accordance with the illustrative embodiments of the invention.

FIG. 7 illustrates a flowchart containing a sequence of steps for performing the illustrative FRR techniques of the present invention. The sequence begins at step 700 and proceeds to step 705 where a MPLS encapsulated data packet is received at a PE device 400. The operating system 460 of the PE device extracts a VPN label value 340 from the received packet, at step 710, and uses the extracted VPN label value to perform a lookup operation in its label forwarding table 500, at step 715. Specifically, a label forwarding table entry 510 is located having an address prefix 520 matching the packet's destination IP address and a VPN label value 530 equal to the packet's extracted VPN label value.

At step 720, the FRR enable flag 550 in the located table entry 510 is analyzed to determine whether FRR operations are currently being performed for packets containing the received VPN label value. If FRR operations are not currently underway, the received packet is processed based on the packet's matching table entry 510 in the label forwarding table 500. The received data packet is then forwarded to its next-hop destination at step 725. The sequence ends at step 760.

If, at step 720, the value of the FRR enable flag indicates that FRR operations should be performed, then at step 730 the FRR exclude flag 560 is analyzed to determine whether the packet is permitted to be FRR rerouted. If the packet is not allowed to be rerouted, the packet is dropped at step 745 and the sequence ends at step 760. When the FRR exclude flag value indicates that FRR operations may be performed for the received packet, the sequence advances to step 735 where it is determined whether there is a is backup PE device 570 identified in the received packet's matching label forwarding table entry 510. If no such backup PE device exists, then at step 745 the packet is dropped and the sequence ends at step 760.

At step 740, the routing operating system 460 determines whether the received data packet contains a service label 330, thereby indicating that the packet has been previously FRR protected. For instance, the service label may be identified based on a predetermined service label value 332, e.g., equal to 4. If at step 740 the received packet is determined to already have been FRR protected, the packet is dropped at step 745 and the sequence ends at step 760. On the other hand, if the packet was not previously protected, the sequence advances to step 750 and an appropriate backup label stack 580, including an IGP label value, a service label value (if necessary) and a VPN label value associated with the backup PE device 570, is inserted in the received packet. The FRR protected packet is then forwarded to the backup PE device, at step 755, preferably via a MPLS or IP tunnel. The sequence ends at step 760.

Advantageously, the inventive technique provides a fast and efficient way for a backup edge device to identify protected data packets that have been previously rerouted in response to, e.g., a CE node or PE-CE link failure. The technique may be used in conjunction with penultimate hop popping (PHP), whereby PHP-enabled devices that are directly attached to a backup edge device "pop" IGP labels from both protected and non-protected data packets before forwarding the packets to the backup edge device. In this case, the service label 330 may be the top-most label in a protected packet's label stack 310 when the protected packet is received at the backup edge device. The technique is not limited to MPLS/VPN network architectures and may be deployed at the edge of networks implementing various topologies and protocols. Further, the invention is not limited to any particular hardware platform or set of software capabilities.

The foregoing has been a detailed description of illustrative embodiments of the invention. Various modifications and additions can be made without departing from the spirit and scope of the invention. For example, a backup edge device may receive protected data packets from directly-attached, PHP-enabled devices as well as from directly-attached, non-PHP-enabled devices. In such a scenario, the backup edge device may utilize service labels in accordance with any of the illustrative embodiments described herein.

While the inventive FRR technique has been illustratively described with respect to MPLS/VPN networks, it is also expressly contemplated that the invention may be deployed at the edge of other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the FRR technique also may be deployed in networks in which customer sites are permitted to participate in more than one VPN.

Furthermore, the illustrative embodiments may be modified to utilize IP Version 6 (IPv6) technology. The IPv6 protocol has been introduced to increase the number of available network addresses and provide additional services at the internetwork layer of the conventional TCP/IP protocol stack. The IPv6 protocol employs a larger address space than its IPv4 predecessor, and utilizes 128 bit (sixteen byte) values to address network nodes rather than the 32 bit addresses employed by IPv4. Those skilled in the art will appreciate that the illustrative embodiments described herein are equally applicable to other address formats, including IPv6 addresses.

It is expressly contemplated that the teachings of this invention can be implemented as software, including a computer-readable medium having program instructions executing on a computer, hardware, firmware, or a combination thereof. For instance, the invention may be implemented by a PE device 400 having one or more processors, some of which may reside on the network interfaces 410 or on line cards containing the network interfaces. Further, the memory 440 may be distributed among a plurality of different memory elements, both local and remote to the PE device 400. In general, the inventive technique may be implemented in various combinations of hardware and/or software. Accordingly, this description is meant to be taken only by way of example and not to otherwise limit the scope of the invention.

What is claimed is:

1. A method for performing fast reroute (FRR) operations at the edge of a computer network, the network having first and second edge devices coupled to a neighboring routing domain, the method comprising:
   detecting a loss of communication between the first edge device and the neighboring routing domain;
   receiving a data packet at the first edge device, the received data packet containing a destination address that is reachable via the neighboring routing domain;
   determining whether a service label is located between an Interior Gateway Protocol (IGP) label and a virtual private network (VPN) label included in the received data packet, the service label indicating that the received packet was previously rerouted in accordance with FRR operations; and
   rerouting, in response to determining that the received data packet does not include the service label between the IGP label and the VPN, the received data packet to the second edge device for forwarding to the neighboring routing domain.

2. The method of claim 1, further comprising:
   dropping the received data packet in response to determining that the received data packet includes the service label.

3. The method of claim 1, further comprising:
   inserting the service label into the received data packet prior to rerouting the packet to the second edge device.

4. The method of claim 1, wherein the step of determining whether a service label is located between an IGP label and a VPN label included in the received data packet further comprises:
   determining that the received data packet includes the service label between the IGP label and the VPN label if the packet contains a label having a predetermined service label value between the IGP label and the VPN label.

5. The method of claim 4, wherein the predetermined service label value equals 4.

6. The method of claim 4, wherein the predetermined service label value is locally allocated at the first edge device.

7. The method of claim 4, wherein the predetermined service label value is selected from a pool of predetermined service label values.

8. The method of claim 1, further comprising:
   forwarding the rerouted data packet from the first edge device to at least one intermediate node before the data packet is received at the second edge device.

9. A method for performing fast reroute (FRR) operations at the edge of a computer network, the network having first and second edge devices coupled to a neighboring routing domain, the method comprising:
   detecting a loss of communication between the first edge device and the neighboring routing domain;
   receiving a data packet at the first edge device, the received data packet containing a destination address that is reachable via the neighboring routing domain;
   determining whether a service label is located at the top of a label stack included in the received data packet, the service label indicating that the received packet was previously rerouted in accordance with FRR operations; and
   rerouting, in response to determining that the received data packet does not include the service label at the top of a label stack, the received data packet to the second edge device for forwarding to the neighboring routing domain.

10. A network node configured to perform fast reroute (FRR) operations at the edge of a computer network, the network node comprising:
    a processor;
    a first network interface adapted to communicate with a neighboring routing domain;
    a second network interface adapted to receive a data packet containing a destination address that is reachable via the neighboring routing domain; and
    a memory adapted to store instructions which are executable by the processor for:
      detecting a loss of communication over the first network interface;
      determining whether a service label is located between an Interior Gateway Protocol (IGP) label and a virtual private network (VPN) label included in the received data packet, the service label indicating that the received packet was previously rerouted in accordance with FRR operations; and
      rerouting, in response to determining that the received data packet does not include the service label between the IGP label and the VPN label, the received data packet to a second edge device for forwarding to the neighboring routing domain.

11. The network node of claim 10, wherein the memory is further adapted to store instructions for:
    dropping the received data packet in response to determining that the received data packet includes the service label.

12. The network node of claim 10, wherein the memory is further adapted to store instructions for:
    inserting the service label into the received data packet prior to rerouting the packet to the second edge device.

13. The network node of claim 10, wherein the memory is further adapted to store instructions for:
    determining that the received data packet includes the service label between the IGP label and the VPN label if the packet contains a label having a predetermined service label value between the IGP label and the VPN label.

14. The network node of claim 13, wherein the predetermined service label value equals 4.

15. The network node of claim 13, wherein the predetermined service label value is locally allocated at the network node.

16. The network node of claim 13, wherein the predetermined service label value is selected from a pool of predetermined service label values.

17. A network node configured to perform fast reroute (FRR) operations at the edge of a computer network, the network node comprising:
    a processor;
    a first network interface adapted to communicate with a neighboring routing domain;
    a second network interface adapted to receive a data packet containing a destination address that is reachable via the neighboring routing domain; and
    a memory adapted to store instructions which are executable by the processor for:
      detecting a loss of communication over the first network interface;
      determining whether the service label is located at the top of a label stack included in the received data packet, the service label indicating that the received packet was previously rerouted in accordance with FRR operations; and
      rerouting, in response to determining that the received data packet does not include the service label at the top of a label stack, the received data packet to a second edge device for forwarding to the neighboring routing domain.

18. A network node configured to perform fast reroute (FRR) operations at the edge of a computer network, the network node comprising:

a first network interface adapted to communicate with a neighboring routing domain;

means for detecting a loss of communication over the first network interface;

a second network interface adapted to receive a data packet containing a destination address that is reachable via the neighboring routing domain;

means for determining whether a service label is located at the top of a label stack included in the data packet received at the second network interface, the service label indicating that the received packet was previously rerouted in accordance with FRR operations; and means for rerouting, in response to determining that the received data packet does not include the service label at the top of the label stack, the received data packet to a second edge device for forwarding to the neighboring routing domain.

19. The network node of claim 18, further comprising:

means for determining that the received data packet includes the service label at the top of the label stack if the packet contains a label having a predetermined service label value at the top of the label stack.

20. The network node of claim 18, further comprising:

means for inserting the service label into the received data packet prior to rerouting the packet to the second edge device.

21. A computer network, comprising:

a first edge device coupled to a neighboring routing domain; and a second edge device coupled to the neighboring routing domain, the second edge device being configured to:

detect a loss of communication with the neighboring routing domain;

receive a data packet containing a destination address that is reachable via the neighboring routing domain;

determine whether a service label is located at the top of a label stack included in the received data packet, the service label indicating that the received packet was previously rerouted in accordance with FRR operations; and reroute, in response to determining that the received data packet does not include the service label at the top of the label stack, the received data packet to the first edge device for forwarding to the neighboring routing domain.

22. The computer network of claim 21, wherein the second edge device is further configured to insert the service label into the received data packet prior to rerouting the packet to the first edge device.

23. The computer network of claim 21, wherein the rerouted data packet is forwarded from the second edge device to at least one intermediate node before being received at the first edge device.

* * * * *

UNITED STATES PATENT AND TRADEMARK OFFICE
CERTIFICATE OF CORRECTION

PATENT NO. : 7,664,013 B2  Page 1 of 1
APPLICATION NO. : 11/068081
DATED : February 16, 2010
INVENTOR(S) : Clarence Filsfils et al.

It is certified that error appears in the above-identified patent and that said Letters Patent is hereby corrected as shown below:

Col. 1, Line 59, please amend as shown:
 [[is ]] though fully set forth herein.

Col. 3, Line 4, please amend as shown:
 tions 12.1-12.3 of the reference[[ is]] book entitled *Interconnec-*

Col. 10, Line 39, please amend as shown:
 such as, e.g., Fast Ethernet (FE), [[is ]]Gigabit Ethernet (GE), Col. 13, Line 52, please amend as shown:
 determined whether there is a[[ is]] backup PE device 570 iden- Signed and Sealed this Tenth Day of August, 2010

David J. Kappos
*Director of the United States Patent and Trademark Office*

UNITED STATES PATENT AND TRADEMARK OFFICE
CERTIFICATE OF CORRECTION

PATENT NO.       : 7,664,013 B2                                             Page 1 of 1
APPLICATION NO.  : 11/068081
DATED            : February 16, 2010
INVENTOR(S)      : Filsfils et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1390 days.

Signed and Sealed this

Twenty-eighth Day of December, 2010

David J. Kappos
*Director of the United States Patent and Trademark Office*